United States Patent [19]

Bray

[11] Patent Number: 4,722,500

[45] Date of Patent: Feb. 2, 1988

[54] FLEXIBLE HOSE SUPPORT

[76] Inventor: Jaycee E. Bray, P.O. Box 116, Randleman, N.C. 27317

[21] Appl. No.: 869,180

[22] Filed: May 30, 1986

[51] Int. Cl.⁴ .............................................. F16L 3/00
[52] U.S. Cl. ........................................ 248/49; 248/83; 248/166; 248/277; 138/106
[58] Field of Search ................... 248/49, 277, 83, 166; 138/106, 108

[56] References Cited

U.S. PATENT DOCUMENTS

| 815,382 | 3/1906 | Rush . | |
|---|---|---|---|
| 910,613 | 1/1909 | Wallace | 248/277 |
| 1,085,620 | 2/1914 | Loring | 248/277 |
| 1,841,278 | 1/1932 | Dallas . | |
| 3,053,351 | 9/1962 | Fulcher . | |
| 3,288,406 | 11/1966 | Degen | 248/49 |
| 3,327,869 | 6/1967 | Guhl et al. . | |
| 3,406,933 | 10/1968 | Wait et al. . | |
| 3,572,622 | 3/1971 | Smith . | |
| 3,672,104 | 6/1972 | Luckey . | |
| 3,730,228 | 5/1973 | Gibbs, Sr. . | |
| 3,809,348 | 5/1974 | Di Laura | 248/49 |
| 3,819,137 | 6/1974 | Smith | 248/49 |
| 4,082,242 | 4/1978 | Smith | 248/49 |
| 4,102,523 | 7/1978 | Finnell | 138/106 |
| 4,125,237 | 11/1978 | Hagins | 248/49 |
| 4,168,006 | 9/1979 | Yamamoto | 248/277 |
| 4,169,571 | 10/1979 | Duggan | 248/49 |
| 4,194,711 | 3/1980 | Winton | 248/49 |
| 4,228,978 | 10/1980 | Rand | 248/49 |
| 4,403,758 | 9/1983 | Burt | 248/49 |

Primary Examiner—J. Franklin Foss
Assistant Examiner—Robert A. Olson
Attorney, Agent, or Firm—Bell, Seltzer, Park and Gibson

[57] ABSTRACT

A support for a flexible hose which is characterized by its ability to provide a gradually sloping trough into which a flexible hose is laid and which can be set up and removed with a minimal amount of effort and in a minimal amount of time. The support includes a plurality of generally vertically extending support members that decrease in height as the support extends from one end of the support to the other. The support members comprise two side portions and a top portion, the top portion having an upwardly opening indentation for receiving a flexible hose. The support also includes a plurality of links pivotally fastened to the support members; some of said links have extensions that act as a base for the support. The cooperation of the support members and links forms a structure that is easily extended and retracted. Furthermore, the combination of the indentations in the top portion of the support members forms a trough into which a flexible hose is laid.

4 Claims, 5 Drawing Figures

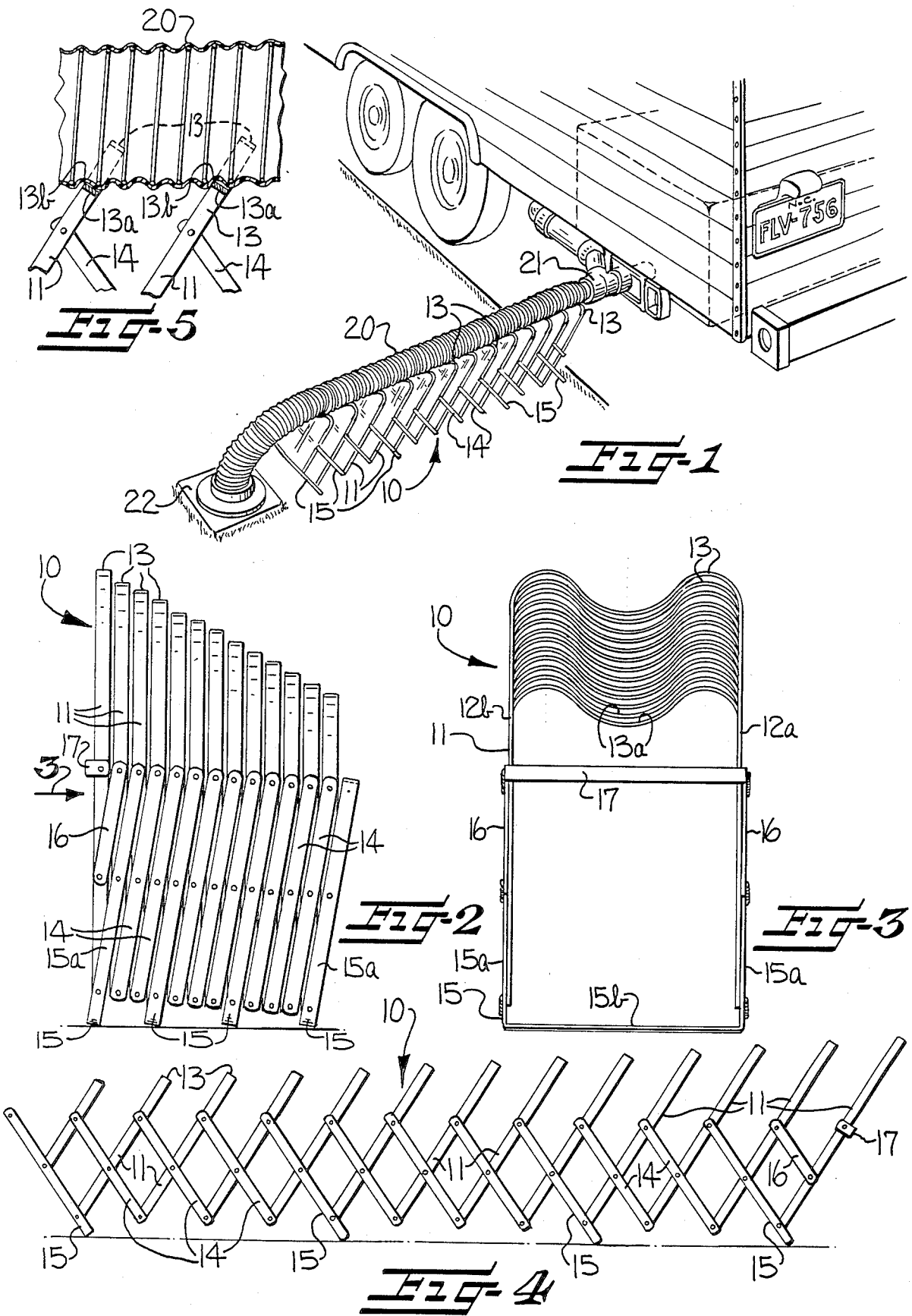

FLEXIBLE HOSE SUPPORT

BACKGROUND OF THE INVENTION

This invention relates to a support for a flexible hose, and more particularly to a support for a flexible hose that extends from a recreational vehicle to a waste hook-up in a trailer park.

Many recreational vehicles such as motorized homes, trailers and campers are equipped with toilets, showers, sinks and the like that have waste materials as a by-product of their use. These waste materials are either temporarily stored in a tank or other receptacle for later removal or directly discharged into a sewage or other waste system at the trailer park. In either situation, the waste material is routed via a flexible hose from an exterior outlet on the the outside of the recreational vehicle to a hook-up to the trailer park's waste system. Such hook-ups are generally located at or near the ground.

Inasmuch as the flexible hose rests on the ground as it extends from the exterior outlet to the waste system hook up, it follows the contour of the terrain between those two points. Often, the terrain does not provide a gradually sloping path, with the result that peaks and valleys are formed in the flexible hose in which reservoirs of waste materials gather. The gathering of waste materials creates potential problems with the flow of other waste materials through the hose, makes the flexible drainage hose difficult to clean out and often results in complete stoppage of the hose. Furthermore, the reservoirs are unhealthy in that they provide a breeding ground for harmful bacteria and insects.

Supports of different types that provide a gradually sloping path have been suggested in the past, but they all have significant drawbacks. For instance, the supports disclosed in U.S. Pat. Nos. 3,809,348 and 3,819,137 both require that a significant number of different components be assembled before the support can be used. And those supports suggested by U.S. Pat. Nos. 3,288,406 and 4,403,758 require appreciable amounts of storage space when not in use.

Another significant drawback encountered in the prior disclosures is the large amount of time required to set up and take down the support. The previously disclosed supports generally require time consuming assembly before they can be arranged to support the flexible hose or require that a plurality of individual support units be arranged along the ground in order to provide sufficient drainage, an exercise that often results in a trial and error procedure before acceptable drainage is achieved. These tasks are time consuming and must be performed when a recreational vehicle first arrives at a trailer park and when it leaves, thereby significantly detracting from the enjoyment and utility of the recreational vehicle.

SUMMARY OF THE INVENTION

It is an object of the present invention to overcome the disadvantages pointed out above in connection with known supports for a flexible hose and to provide a support for a flexible hose that requires no assembly, can be easily stored and can be set up and taken down with a minimal expenditure of time. More particularly, it is an object of this invention to provide a support for a flexible hose that supports the hose substantially throughout its length and that decreases its vertical dimension as it extends from one end to the other. It is a further object of this invention to provide a flexible hose support that can be easily folded into a compact unit.

The present invention, in its preferred embodiment, is comprised of a plurality of support members that gradually decrease in height as the support extends from one end to the other and a plurality of links pivotally fastened to the side portions of adjacent support members. Preferably, said support members comprise downwardly opening U-shaped members. Each downwardly opening U-shaped member has a top portion with an indentation, preferably arcuate, for receiving and supporting the lower exterior surface of the drainage hose that, in conjunction with the other downwardly opening U-shaped members, forms a trough in which the flexible hose can be laid.

Other advantages and a fuller understanding of the invention will be had from the following detailed description when taken in conjunction with the accompaning drawings.

BRIEF DESCRIPTION OF THE DRAWINGS

FIG. 1 is a perspective environmental view of a recreational vehicle in a campground or park showing the present invention supporting a flexible drain hose extending from the recreational vehicle to the waste facilities of the campground or park.

FIG. 2 is a side elevational view of the present invention in its collapsed configuration.

FIG. 3 is a front elevational view of the flexible hose support in the direction of the arrow in FIG. 2

FIG. 4 is a side elevational view of the present invention in its extended configuration and having an orientation opposite of that shown in FIG. 2.

FIG. 5 is a sectional view of the flexible hose laid in the flexible hose support.

DESCRIPTION OF THE ILLUSTRATED EMBODIMENT

As seen in FIG. 1, the flexible hose support 10 provides support for the flexible drainage hose 20 as it extends from the exterior waste outlet 21 of the recreational vehicle to the permanent hook up 22 to the waste system of the campground or park. The exterior waste outlet is connected with a commode, tank, or other waste receptacle of the recreational vehicle; the permanent hook up 22 leads directly to the waste system of the campground or park. The support routes the flexible hose in such a way that the hose gradually slopes downward as it extends from the recreational vehicle to the permanent hook up 22. Such a gradual slope ensures that all of the waste discharged from the recreational vehicle flows directly into the waste system, eliminates any peaks or valleys that would otherwise form in the flexible hose if it were merely laid on the ground and facilitates cleaning of the flexible hose.

FIGS. 2 through 4 illustrate one embodiment of the structure of the flexible hose support. As best seen in FIG. 2 and 3, the hose support is comprised of a plurality of downwardly opening U-shaped members 11 that extend generally vertically from the base of the support. The downwardly opening U-shaped members 11 have two side portions 12a and 12b and a top portion 13. The downwardly opening U-shaped members gradually decrease in height as the support extends from one of its ends to the other end; each downwardly opening U-shaped member is preferably shorter than the U-shaped member that precedes it. It will be obvious to those skilled in the art that the downwardly opening U-shaped members may be made of plastic, metal or of any other material that can be suitably molded or shaped and is sufficiently strong and rigid to provide adequate support for the flexible hose.

As illustrated in FIG. 3, the top portion 13 of the downwardly opening U-shaped members 11 each have an arcuate indentation 13a. The plurality of downwardly opening U-shaped members with the indentation forms an arcuate trough or saddle that extends the entire length of the support in which the flexible drain hose can be easily laid. Because the trough has the same approximate diameter as the hose, when the flexible drain hose is laid in the trough it reduces any tendency that the hose would otherwise have to shift its position from side to side and as a result become disconnected from the exterior waste outlet 21 or permanent hook-up 22.

Additionally, as is obvious in FIG. 5, when the support is in its extended configuration, the surface of each top portion 13 (and thus, the arcuate indentation) of each downwardly opening U-shaped member extends diagonally from the horizontal and forms an edge at 13b that nests with the corrugations of the flexible hose, and substantially eliminates the tendency of the flexible hose to shift longitudinally in the trough. Accordingly, the configuration of the downwardly opening U-shaped members, and more particularly, the arcuate indentation in their top portion, provides a hose support of increased stability and utility.

The downwardly opening U-shaped members are joined together by a plurality of links 14. As seen in FIG. 2 and 4, the links are frictionally engaged at each of their ends and at their center to each of three adjacent downwardly opening U-shaped members. The links allow the support members to be extended and remain equally spaced relative to each other, and when the hose support is retracted they allow it to collapse into a compact unit.

Preferably, some of the links 14 have extensions extending between parallel links on opposite sides of the hose support that act as a base for the support. In the illustrated embodiment, the extensions combine with the links to comprise upwardly opening U-shaped members 15. The upwardly opening U-shaped members comprise two upright portions 15a and a bottom portion 15b. The upright portions are frictionally engaged at their center and ends to the side portions of each of three adjacent downwardly opening U-shaped members. The combination of the various bottom portions comprise a base for the flexible hose support that contacts the ground lying underneath the support.

The support is also comprised of two links at 16 that are frictionally engaged to only two downwardly opening U-shaped members. Additionally, handle members 17 extend across the opening between the side portions of two downwardly opening U-shaped members and provide a means by which an individual may carry and manipulate the flexible hose support. When the handles 17 are grasped and pulled in opposite directions, the downwardly opening U-shaped members and links cooperate to allow the flexible hose support to extend. When extended, the top portion of each downwardly opening U-shaped member moves from a horizontal to diagonal position and, as enumerated above, creates an edge at 13b that nests with the corrugations of the flexible hose.

The combination and co-operation of the above described elements results in a support that is versatile, easy to use and easily stored. More particularly, and as is seen in FIG. 2 and 4, the combination of the downwardly opening U-shaped members, links and upwardly opening U-shaped members, and the pivotal manner in which they are connected, results in what is commonly referred to in the art as a lazy tong structure; a structure in which the separate members pivot in relation to one another so as to extend as shown in FIG. 4 and retract as shown in FIG. 2. In the present invention, such a structure enables the support to be adaptable to a large number of different situations. The support can be extended so that it provides support for the entire length of the flexible hose no matter how far the exterior outlet is from the permanent hook-up. Additonally, because the vertical distance from the trough to the ground decreases as the support is extended, the support is easily adaptable to different height exterior outlets on different recreational vehicles. Furthermore, the support is easily stored when not in use as it can be retracted into a compact unit as shown in FIG. 2.

An important feature of the present invention is the timeliness with which it can be used. The structure of the support facilitates extention from its retracted configuration shown in FIG. 2 to an extended configuration as shown in FIG. 4 simply by asserting the appropriate force on handle members 17. After extension, the support is easily placed on the ground between the exterior outlet on the recreational vehicle and the waste system hook up. The drainage hose set up is completed by laying the flexible hose in the support's trough. Accordingly, the time consuming tasks of assembling the support or setting out a plurality of individual support units is substantially eliminated, leaving more time for the enjoyment of one's recreational activity.

In the drawings and specification, there has been set forth preferred embodiments of the invention, although specific terms are employed, they are used in a generic and descriptive sense only and not for the purpose of unduly limiting the scope of the present invention, which scope is defined by the appended claims.

That which is claimed is:

1. A support for a flexible hose comprising:
   a plurality of generally vertically extending downwardly opening rigid U-shaped support members having two side portions and a top portion, said downwardly opening U-shaped support members gradually decreasing in height as the flexible hose support extends from one end to the other, and each top portion having an upwardly opening, generally arcuate indentation to receive and support said flexible hose.
   means for connecting said downwardly opening support members and holding each of them in a desired extended or retracted relationship comprising a plurality of links pivotally and frictionally connected at their ends and at points intermediate their ends to said side portions of adjacent downwardly opening support members,
   a plurality of upwardly opening rigid U-shaped base members connected to some of said downwardly opening rigid U-shaped support members and having two upright portions and a bottom portion, said base members being frictionally and pivotally connected at the ends of each upright portion and at points intermediate the ends of each upright portion to the side portions of said downwardly opening U-shaped support members, at least one handle member extending across the opening between side portions of the end-most support members or base members, whereby the pivotal and frictional interconnection between the downwardly opening rigid U-shaped support members, links and upwardly opening rigid U-shaped base members forms a structure extendable and retractible to any desired length.

2. A support for a flexible drainage hose comprising:

a plurality of generally vertically extending downwardly opening rigid U-shaped support members each having two side portions and a top portion, with said support members being arranged in a longitudinally extending, parallel array so as to define opposite sides and opposite ends of said support, said downwardly opening U-shaped support members gradually decreasing in height from one end of said support to the other, and each top portion having an upwardly opening, generally arcuate indentation to receive and support said flexible drainage hose, means interconnecting said side portions of said support members along each of said sides of said support and so as to hold said support members in a desired extended or retracted relationship, and comprising a plurality of parallel links along each of said sides of said support, with each of said links being pivotally and frictionally connected to said side portions of a plurality of adjacent support members, at least a plurality of said links along each of said opposite sides of said support having extensions which extend below said side portions of said support members for engaging the ground and acting as a base for said support, and such that when said support is supported on level ground by said base, said top portions of said support members decline in height from said one end of said support to the other.

3. The support as defined in claim 2 wherein said extensions are joined to respective ones of the extensions along the opposite side of said support by a transverse member, and such that each pair of joined extensions and the associated transverse member define an upwardly opening U-shaped base member.

4. The support as defined in claim 3 further comprising at least one handle member extending across the opening between said side portions of the support member at at least one of said ends of said support.

* * * * *